United States Patent
Herdrich et al.

(10) Patent No.: US 12,271,308 B2
(45) Date of Patent: *Apr. 8, 2025

(54) CONTROLLER FOR LOCKING OF SELECTED CACHE REGIONS

(71) Applicant: Intel Corporation, Santa Clara, CA (US)

(72) Inventors: Andrew J. Herdrich, Hillsboro, OR (US); Priya Autee, Chandler, AZ (US); Abhishek Khade, Chandler, AZ (US); Patrick Lu, Chandler, AZ (US); Edwin Verplanke, Chandler, AZ (US); Vivekananthan Sanjeepan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,553

(22) Filed: Dec. 28, 2023

(65) Prior Publication Data
US 2024/0232078 A1 Jul. 11, 2024

Related U.S. Application Data

(63) Continuation of application No. 16/514,226, filed on Jul. 17, 2019.

(51) Int. Cl.
*G06F 12/0802* (2016.01)
(52) U.S. Cl.
CPC .... *G06F 12/0802* (2013.01); *G06F 2212/681* (2013.01)

(58) Field of Classification Search
CPC ............. G06F 12/0802; G06F 12/0811; G06F 12/0864; G06F 12/0871; G06F 2212/604; G06F 2212/6042
See application file for complete search history.

(56) References Cited

U.S. PATENT DOCUMENTS

| 6,044,478 A | 3/2000 | Green |
| 6,671,779 B2 | 12/2003 | Devereux |

(Continued)

OTHER PUBLICATIONS

Bilicki, Ivan, "Cache Line Reservation: Exploring a Scheme for Cache-Friendly Object Allocation", Department of Electrical & Computer Engineering, McGill University, Montreal, Canada, Oct. 2009, 107 pages.

(Continued)

*Primary Examiner* — Tracy A Warren
(74) *Attorney, Agent, or Firm* — NICHOLSON DE VOS WEBSTER & ELLIOTT LLP

(57) ABSTRACT

Examples provide an application program interface or manner of negotiating locking or pinning or unlocking or unpinning of a cache region by which an application, software, or hardware. A cache region can be part of a level-1, level-2, lower or last level cache (LLC), or translation lookaside buffer (TLB) are locked (e.g., pinned) or unlocked (e.g., unpinned). A cache lock controller can respond to a request to lock or unlock a region of cache or TLB by indicating that the request is successful or not successful. If a request is not successful, the controller can provide feedback indicating one or more aspects of the request that are not permitted. The application, software, or hardware can submit another request, a modified request, based on the feedback to attempt to lock a portion of the cache or TLB.

22 Claims, 12 Drawing Sheets

(56) References Cited

U.S. PATENT DOCUMENTS

| | | | |
|---|---|---|---|
| 8,874,844 B1 | 10/2014 | Glasco et al. | |
| 9,645,942 B2 | 5/2017 | Zyulkyarov et al. | |
| 2002/0046326 A1* | 4/2002 | Devereux | G06F 12/126 711/E12.075 |
| 2006/0277351 A1 | 12/2006 | Osanai et al. | |
| 2007/0150658 A1 | 6/2007 | Moses et al. | |
| 2008/0022046 A1 | 1/2008 | Miller | |
| 2008/0147989 A1 | 6/2008 | Williams, III | |
| 2009/0006784 A1 | 1/2009 | Takeuchi | |
| 2012/0268458 A1 | 10/2012 | Gao et al. | |
| 2013/0191600 A1 | 7/2013 | Kuesel et al. | |
| 2015/0242337 A1 | 8/2015 | Aggarwal et al. | |
| 2015/0268979 A1 | 9/2015 | Komarov et al. | |
| 2016/0179681 A1 | 6/2016 | Greenspan et al. | |
| 2016/0328327 A1 | 11/2016 | Greenspan et al. | |
| 2018/0067863 A1 | 3/2018 | Ki | |
| 2019/0013965 A1 | 1/2019 | Sindhu et al. | |
| 2019/0340123 A1 | 11/2019 | Herdrich et al. | |
| 2020/0004603 A1 | 1/2020 | Gambino | |
| 2021/0042228 A1 | 2/2021 | Herdrich et al. | |

OTHER PUBLICATIONS

Chatre, Reinette, https://events 19.linuxfoundation.org/wp-content/uploads/2017/11/Introducing-Cache-Pseudo-Locking-to-Reduce-Memory-Access-Latency-Reinette-Chatre-Intel.pdf, Nov. 2017, 43 pages.
European Search Report and Search Opinion, EP App. No. 23184575.1, Oct. 20, 2023, 09 pages.
Extended European Search Report for Patent Application No. 20166262.4, Mailed Dec. 21, 2020, 7 pages.
Final Office Action, U.S. Appl. No. 16/514,226, Dec. 9, 2021, 31 pages.
Final Office Action, U.S. Appl. No. 16/514,226, Dec. 23, 2020, 22 pages.
Final Office Action, U.S. Appl. No. 17/069,819, Aug. 30, 2023, 35 pages.
Final Office Action, U.S. Appl. No. 17/069,819, May 5, 2023, 40 pages.
Heins, Milch, "NetSpeed's Pegasus Last-Level Cache IP Improves Soc Performance and Reduces Latency", SemiWik.com, https://semiwiki.com/x-subscriber/netspeed-systems/6904-netspeeds-pegasus-last-level-cache-ip-improves-soc-performance-and-reduces-latency, Jul. 17, 2017, 6 pages.
Ignitelock (Ignite 2.7.0), "Interface IgniteLock", https://ignite.apache.org/releases/latest/javadoc/org/apache/ignite/Ignite . . . Nov. 30, 2018, 6 pages.
Intel Resource Director Technology, "Unlock System Performance in Dynamic Environments", http://infocenter.arm.com/help/index.jsp?topic=/com.arm.doc.ddi0092b/ch04s06s01.html, downloaded Dec. 4, 2019, 5 pages.
Intel RTD Documentation for Cache Psuedo-Locking, https://www.spinics.net/lists/linux-tip-commits/msg44332.html, Jun. 19, 2018, 6 pages.
Intel(R) Resource Director Technology Cache Psuedo-Locking enabling https://www.intel.com/content/www/us/en/architecture-and-technology/resource-director-technology.html, May 29, 2018, 5 pages.
Intel, "Intel(Registered) 64 and IA-32 Architectures Software Developer's Manual", vol. 3A: System Programming Guide, Part 1, Chapter 11, Sep. 2016, 36 pages.
Intel, "Intel(Registered) 64 and IA-32 Architectures Software Developer's Manual", vol. 3B: System Programming Guide, Part 2, Chapters 17.15 and 17.16, Sep. 2016, 10 pages.
Intel, "Intel(Registered) Resource Director Technology (Intel(Registered) ROT) on 2nd Generation Intel(Registered) Xeon(Registered) Scalable Processors Reference Manual", Revision 1.0, Apr. 2019, 24 pages.
Jeong, Jinkyu, et al., "Device-reserved Memory as an Eviction-based File Cache", KA IS T Department of Computer Science, Jul. 25, 2012, 14 pages.
Li, Bin et al., "RLDRM: Closed Loop Dynamic Cache Allocation with Deep Reinforcement Learning for Network Function Virtualization", 2020 6th IEEE International Conference on Network Softwarization (NetSoft), Aug. 2020, 9 pages.
Non-Final Office Action, U.S. Appl. No. 16/514,226, Jul. 22, 2020, 21 pages.
Non-Final Office Action, U.S. Appl. No. 16/514,226, May 12, 2021, 27 pages.
Non-Final Office Action, U.S. Appl. No. 17/069,819, Jan. 10, 2024, 31 pages.
Non-Final Office Action, U.S. Appl. No. 17/069,819, Sep. 28, 2022, 40 pages.
Office Action, EP App. No. 20166262.4, Jan. 4, 2023, 5 pages.
Part 1—RM940T—Rev 0, Technical Reference Manual, http://infocenter.arm.com/help/index.jsp?topic=/com.arm.doc.ddi0092b/ch04s06s01.html, Armddi 0092B, Full First Release, Sep. 1998, 90 pages.
Part 2—RM940T—Rev 0, Technical Reference Manual, http:/infocenter.arm.com/help/index.jsp?topic=/com.arm.doc.ddi0092b/ch04s06s01.html, Armddi 0092B, Full First Release, Sep. 1998, 50 pages.
Part 3—RM940T—Rev 0, Technical Reference Manual, http://infocenter.arm.com/help/index.jsp?topic=/com.arm.doc.ddi0092b/ch04s06s01.html, Armddi 0092B, Full First Release, Sep. 1998, 44 pages.
Segars, Simon, "The ARM9 Family—High Performance Microprocessors for Embedded Applications", Manager CPU Development, ARM Lid., Sep. 16, 1998, 6 pages.
Sohal, Parul et al., "A Closer Look at Intel Resource Director Technology (ROT)", RTNS '22, Jun. 7-8, 2022, Paris, France, 13 pages.
U.S. Appl. No. 18/084,258, filed Dec. 19, 2022, 29 pages.
DPDK (Data Plane Development Kit), "Internet Protocol (IP) Pipeline Application", Available Online at <https://dpdk.org/doc/guides/sample_app_ug/ip_pipeline.html>, Jul. 3, 2018, 14 pages.
Final Office Action, U.S. Appl. No. 16/514,226, Oct. 12, 2023, 31 pages.
Final Office Action, U.S. Appl. No. 17/069,819, Jun. 3, 2024, 30 pages.
Juniper Networks, Inc., "vMX Use Cases for vBNG and vLNS—Case Study", Version 1.0, Available Online at <https://www.juniper.net/documentation/en_US/release-independent/solutions/information-products/pathwaypages/solutions/vbng-vlns-vmx.pdf>, Aug. 2016, 8 pages.
Non-Final Office Action, U.S. Appl. No. 16/514,226, Jun. 12, 2024, 22 pages.
Notice of Allowance, U.S. Appl. No. 16/514,226, Oct. 24, 2024, 19 pages.

* cited by examiner

| id# | Scratch Pad Offset | TOR | BOR | Set_Start | Set_End | Way_Start | Way_End | COS | Policy | Thread_grp_ass ociation | Access level | Structure TypeCode |
|---|---|---|---|---|---|---|---|---|---|---|---|---|
| | | | | | | | | | | | | |
| | | | | | | | | | | | | |

FIG. 2B

CONTROLLER FOR LOCKING OF SELECTED CACHE REGIONS

CROSS REFERENCE TO RELATED APPLICATION

This application is a continuation of co-pending U.S. patent application Ser. No. 16/514,226, filed on Jul. 17, 2019, all of which is herein incorporated by reference.

TECHNICAL FIELD

Various examples described herein relate to cache management and locking of cache regions.

BACKGROUND

For telecommunication services, many service level agreements (SLA) are defined around latency oriented metrics, with performance requirements defined in a series of Service Level Objectives (SLOs). Services include, for example, voice over IP (VOIP), video conferencing, high frequency trading, real-time intrusion protection and detection systems, and so forth. To meet these workloads' requirements, software needs to have full control of the hardware to guarantee resource availability. In this environment, commonly shared resources such as last level cache, memory bandwidth or input/output (I/O) bandwidth needs to be favored or prioritized for workloads. For example, a search engine provider has some service level objectives (SLO) where latency for web search workloads need to have guaranteed upper bound time. In order to achieve that SLO, the system is kept physically isolated, so resources are all available for queries. However, very low utilization in the data center racks and high total cost of ownership (TCO) can occur because the system resources are underutilized most of the time.

BRIEF DESCRIPTION OF THE DRAWINGS

FIG. 2B provides an example of possible scratch pad/local cache table entries.

FIG. 4A-1 and FIG. 4A-2 depict an example process performed by a controller to permit or deny cache or TLB locking.

DETAILED DESCRIPTION

Figure 1:
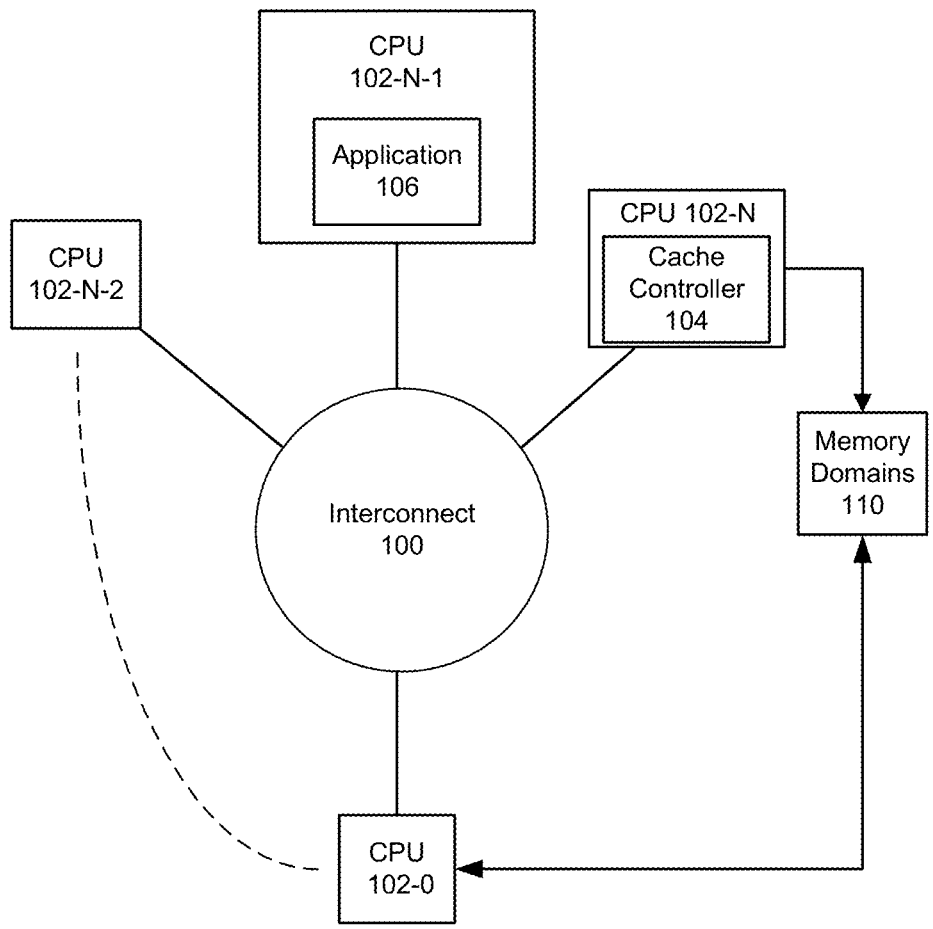
FIG. 1 depicts an example system.

For situations where software-implemented operations require rapid access to data or code, such data or code can be stored in a cache. Accordingly, the use of a cache to store data is common in highly latency sensitive scenarios such as software defined network functions virtualization (NFV) operations, broadband remote access servers (BRAS), voice over IP (VOIP), 4G or 5G switching and routing, process execution at edge nodes, command of self-driving vehicles, content distribution networks (CDN), and others. Cache resources are limited such that processors and processor-executed software contend for precious cache resources and can cause eviction of data or code from the cache. Eviction of data or code from the cache can lead to non-deterministic execution times, which may lead to violation of applicable SLAs or SLOs.

Locking cache lines and their content is one approach to ensuring content remains in the cache and is accessible. A known approach for locking a portion of a cache is available from ARM, which provides a way to lock down a portion of an instruction cache or data cache. However, this is limited only to locking of a Last Level Cache (LLC) and cannot be used to go further up in memory hierarchy. The ARM940T instruction and data caches comprise four segments, each with 64 lines of four words each. Each segment is 1 KB in size. Lock down can be performed with a granularity of one line across each of the four segments and the smallest space which may be locked down is 16 words. Lock down starts at line zero and can continue until 63 of the 64 lines are locked. If there were more data to lock down, then at the final step, step 7, the DL bit should be left HIGH, Dindex incremented by 1 line, and the process repeated. The DL bit should only be set LOW when all the lock down data has been loaded.

Intel® Resource Director Technology (RDT) allows partitioning of a last level cache between high priority processes and normal priority processes such that they can drive up system utilization without violating high priority process SLO.

Various embodiments provide an application program interface or communication by which an application, software, or hardware can request to lock or unlock a region of a cache or translation lookaside buffer (TLB) entry. A cache can be a level-1, level-2, lower or last level cache (LLC), among others. A controller can be provisioned to monitor which regions of a cache or TLB are locked (e.g., pinned) or unlocked (e.g., unpinned). The controller can be interrogatable by an application, software, or hardware to identify which regions of a cache or TLB are locked or unlocked. The controller can respond to a request to lock or unlock a region of cache or TLB by indicating that the request is successful (e.g., granted) or not successful (e.g., denied). If a request is not successful, the controller can provide feedback indicating one or more aspects of the request that are not permitted. The application, software, or hardware can submit another request, a modified request, based on the feedback such that the modified request would not also run afoul of the feedback indicating one or more aspects of the request that are not permitted.

FIG. 1 depicts an example system. One or more central processing units (CPUs) 102-0 to 102-N can be communicatively coupled to an interconnect 100. Interconnect 100 can provide communications among CPUs 102-0 to 102-N. Interconnect 100 can be compatible at least with Intel QuickPath Interconnect (QPI), Intel Ultra Path Interconnect (UPI), Intel On-Chip System Fabric (IOSF), Omnipath, Ethernet, Compute Express Link (CXL), HyperTransport, high-speed fabric, PCIe, NVLink, Advanced Microcontroller Bus Architecture (AMBA) interconnect, OpenCAPI, Gen-Z, CCIX, and so forth. Although not shown, additional CPUs, L3 caches, accelerators, and/or other devices may be connected to the high speed interconnect of interconnect 502. Other devices may include, for example, one or more memory devices (e.g., dual in-line memory modules (DIMMs)) hosting memories included in memory domains 110. Any core 102 can include or use cache controller 104. Cache controller 104 can monitor and control locking of any region of a cache or TLB 220. A core of a CPU can execute an application (e.g., application 106) or other software that requests locking of a region of a cache or indication of what portion of a cache be locked.

A core can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh.

Figure 2A:
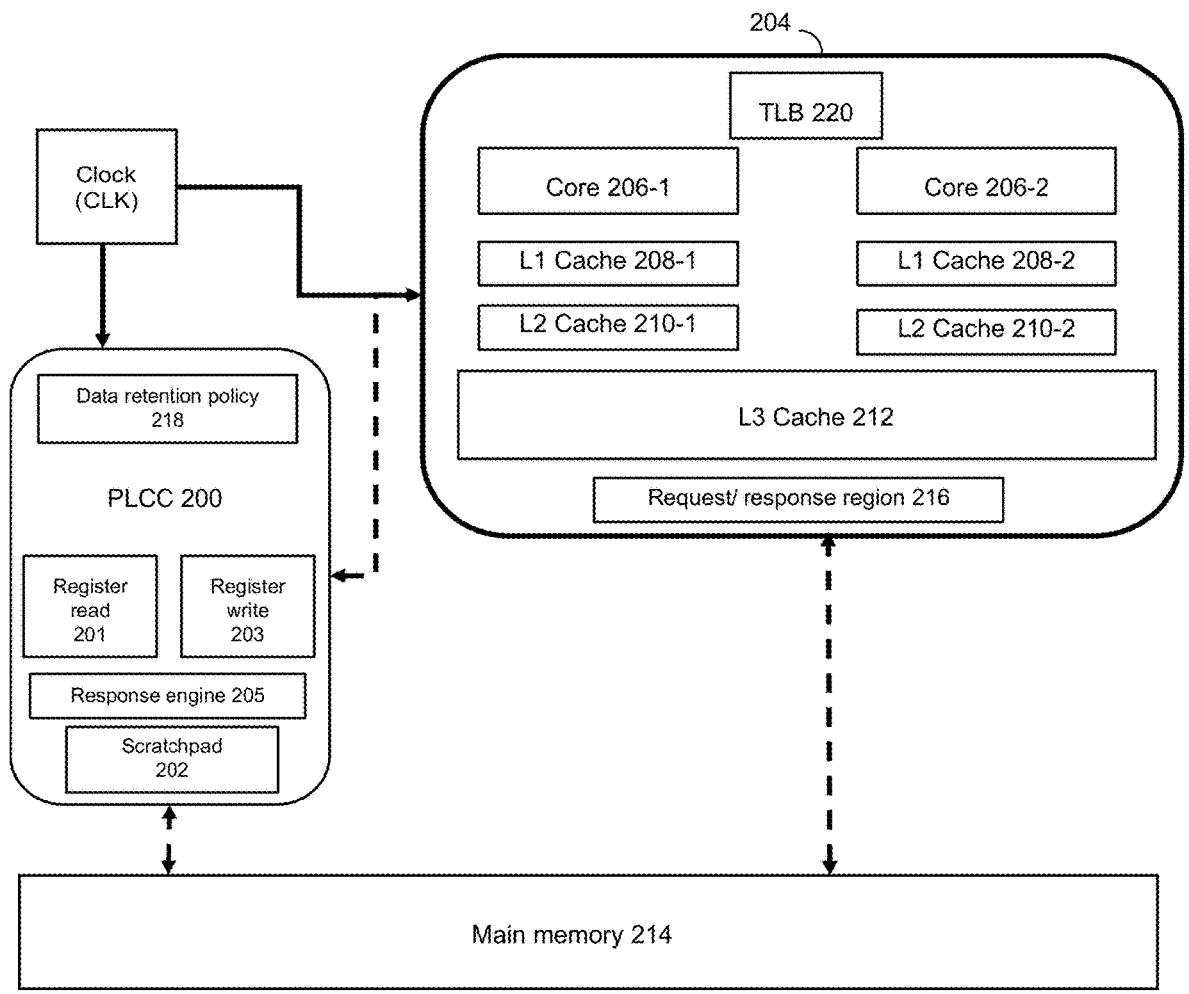
FIG. 2A depicts an example of a pseudo cache locking controller in accordance with some embodiments.

FIG. 2A depicts an example of a pseudo cache locking controller in accordance with some embodiments. Pseudo-locking cache controller (PLCC) 200 can facilitate cache locking throughout any level of a cache. Controller 200 can be assigned by an operating system (OS) or privileged thread to be responsible for locking a portion of any of L1, L2, L3, LLC, TLB 220, or decoded instruction stream cache. Other portions of L1, L2, L3 or TLB can be locked by the OS. However, locking of regions of a cache or TLB by controller 200 can be overridden by the OS or some commands or functions such as write back and invalidate (WB-INVD) or power management. In some examples, if a cache line is locked using a lock bit, such lock bit is not used to lock a region of cache or TLB assigned to controller 200. Instead, controller 200 can lock a region by designating a region locked in scratch pad 202 and treating the region as locked to requests to lock the region. However, in some embodiments, controller 200 can lock a region by designating a region locked in scratch pad 202 and also lock the region using lock bits.

Controller 200 allows all caches and TLB 220 to be locked to achieve greater level quality of service (QOS) for performance of applications or threads as executable code or data are stored in cache and readily available for access. Any level of cache can include code or data cache, translation lookaside buffer (TLB) 220, L1 cache, L2 cache, and/or L3 cache. Controller 200 provides a programmable interface to lock or unlock a region of a cache (e.g., L1, L2, L3), TLB and so forth. For example, request/response region 216 can be used to write requests, read requests, write responses, or read responses. Using the programming interface, an application or device can request that controller 200 lock a region of a cache or TLB 220 by at least specifying dimensions (e.g., bottom and top of range) of the cache region to lock. The application can request to lock the region for use to store workloads, executable binaries, un-compiled instructions, complied instructions, or data, or for any uses.

For example, TLB 220 can store virtual-to-physical address translations. Controller 200 can lock contents of TLB 220 to allow for locking of certain virtual-to-physical mappings. For example, a virtual-to-physical mapping can be locked to ensure its availability when a translation is needed. For example, if executable instructions are stored in a cache and the instructions reference other code (e.g., branches, jump, subroutine), then locking of the virtual-to-physical mapping in the TLB can allow for availability of virtual-to-physical address mapping to the other code without having to perform an address translation operation.

Request/response region 216 can be one or more of model specific register (MSR), memory-mapped I/O (MMIO), memory type range registers (MTRRs), model specific registers (MSRs), shared memory region (including virtual memory), and/or register files. For example, to write or read from MSRs, wrmsr or rdmsr instructions can be used. An MSR can include control registers used for program execution tracing, toggling of compute features, and/or performance monitoring. The MSR can include one or more of: memory order buffer (MOB) control and status; page fault error codes; clearing of page directory cache and TLB entries; control of the various cache memories in the cache hierarchy of the microprocessor, such as disabling portions or all of a cache, removing power from portions or all of a cache, and invalidating cache tags; microcode patch mechanism control; debug control; processor bus control; hardware data and instruction pre-fetch control; power management control, such as sleep and wakeup control, state transitions as defined by ACPI industry standards (e.g., P-states and C-states), and disabling clocks or power to various functional blocks; control and status of instruction merging; ECC memory error status; bus parity error status; thermal management control and status; service processor control and status; inter-core communication; inter-die communication; functions related to fuses of the microprocessor; voltage regulator module VID control; PLL control; cache snoop control; write-combine buffer control and status; overclocking feature control; interrupt controller control and status; temperature sensor control and status; enabling and disabling of various features, such as encryption/decryption, MSR password protection, making parallel requests to the L2 cache and the processor bus, individual branch prediction features, instruction merging, microinstruction timeout, performance counters, store forwarding, and speculative table walks; load queue size; cache memory size; control of how accesses to undefined MSRs are handled; multi-core configuration; configuration of a cache memory (e.g., de-selecting a column of bit cells in a cache and replacing the column with a redundant column of bit cells), duty cycle and/or clock ratio of phase-locked loops (PLLs) of the microprocessor, and the setting voltage identifier (VID) pins that control a voltage source to the microprocessor.

In some example, caches (e.g., Intel architecture caches) are organized in the form of ways and sets, however cache accessibility can use semantics other than N way set associative such that a subset of a cache can be reserved for control by a cache lock controller. An application executing on a core can query controller 200 for a cache region that is available to lock and the application can check the status of cache locking and decide what region of cache to request based on available lockable cache specified according to ways and sets. An interface can be provided to specify how much of each cache level can be allocated for control by controller 200. For example, a model specific register (MSR) interface, register, or an interface on the controller itself could be used to specify how much of each cache level is allocated for control by controller 200.

Register read logic 201 can read instructions in request/response region 216. Response engine 205 can interpret instructions in request/response region 216 and form a response. For example, for an instruction to lock a cache region in request/response region 216, response engine 205 can interpret the response and acknowledge receipt of the instruction via use of register write 203 to request/response region 216. Response engine 205 can lock a region of cache or TLB based on indications in scratch pad 202 of unlocked regions in cache or TLB. Response engine 205 can write a response to request/response region 216, using response engine 205, where the response indicates a request to lock a region of cache is granted at least based on the request identifying a region of cache or TLB that is not identified as locked in scratch pad 202. Response engine 205 can be implemented as software executed by a processor and/or a hardware device. In some examples, response engine 205 can be implemented in a network interface device that uses or accesses a cache or TLB.

Scratch pad 202 can be a table that tracks what portions of a cache subsystem are occupied and what is available for locking or occupation. For example, a scratch pad size of up to 8 kilobytes can accommodate various cache hierarchies to track occupied or unoccupied cache areas that can be locked or unlocked. Scratch pad 202 can be a table stored in a register, cache, memory, or storage. For example, a portion of scratch pad 202 can be stored in an associated level of a cache resource referred to by the portion. Various non-limiting formats of a scratch pad are described herein.

Data retention policy 218 can be set by an application for locked regions of cache or TLB. A data retention policy sets an eviction or flushing policy for the locked content. For example, a policy can be fast eviction is permitted, slow is required, or balanced eviction. Controller 200 can be configured to not allow locked regions under its control to be evicted by eviction policies.

Controller 200 can be coupled to one or more central processing units (CPUs) by use of an interconnect (e.g., PCIe), bus, mesh, fabric, motherboard, or any connectivity. In this example, controller 200 is coupled to control caches of CPU 204 and CPU 204 includes cores 206-1 and 206-2 and associated caches. For example, core 206-1 can access (e.g., read from or write to) at least L1 cache 208-1, L2 cache 210-1, and L3 cache 212. Core 206-2 can access (e.g., read from or write to) at least L1 cache 208-2, L2 cache 210-2, and L3 cache 212. Although in other implementations, a cache can be shared by one or more cores. Controller 200 can monitor locking and permit locking at least of L1 cache 208-1, 208-2, L2 cache 210-1, 210-2, and L3 cache 212. In some examples, in addition to controller 200, a root complex integrated endpoint manages locking or unlocking of the L3 cache.

Main memory 214 can be a memory device or devices that are locally connected to controller 200 and CPU 204 or remotely accessible via a bus, interconnect, or network. Main memory 214 can store any content (e.g., data, executable code, binaries, byte codes, and so forth) that is to be written to any cache or cache content can be flushed to main memory 214. Note that main memory 214 can represent physical and/or virtual memory regions and/or pools of memory devices, including distributed memory pools.

Controller 200 can be implemented as a microcontroller, state machine, core that executes a process, fixed function device (e.g., field programmable gate array), and so forth.

Controller 200 could be implemented in an uncore or system agent to provide a single unified interface. A system agent can include or more of a memory controller, a shared cache, a cache coherency manager, arithmetic logic units, floating point units, core or processor interconnects, or bus or link controllers. System agent can provide one or more of: direct memory access (DMA) engine connection, non-cached coherent master connection, data cache coherency between cores and arbitrates cache requests, or Advanced Microcontroller Bus Architecture (AMBA) capabilities.

In some examples, a thread or instance of controller 200 can be assigned to a different portion of cache or level of cache or TLB and each thread or instance is responsible for locking or unlocking regions in that portion. Accordingly, multiple different threads or instances of controller 200 can be used to manage a different portion of a cache or TLB. The threads or instances of controller 200 can operate independently or in parallel.

FIG. 2B provides an example of possible scratch pad/local cache table entries. An example description of fields in the scratch pad is below.

| Field | Example description |
|---|---|
| id# | Unique identifier for each entry in the table |
| Scratch Pad Offset | This offset within scratch pad to identify different memory hierarchy. |
| TOR (Top of Address Range) | Top of Address Range |
| BOR (Base of Address Range) | Base of Address Range |
| Set_Start | Start of Set (e.g., SET 0 to SET 1023). Start of Set < Set_End (Min Set = 0 and Max Set = 1023). |
| Set_End | End of Set (e.g., SET 1023). End of Set > Set_End (Min Set > Set_Start and Max Set = 1023) |
| Way_Start | Start of Way (e.g., SET 0 to SET 15). Start of Way < Way_Start (Min Set = 8 and Max Set = 15). |
| Way_End | End of Way (e.g., 15). End of Way > Way_End (Way_End > Way_Start and Max Way = 15) |
| COS | Class of service number |
| Policy | Data retention policy. See Table 6 for an example format for communicating a retention policy. |
| Thread_grp_association | Associate this COS with a core or set of cores, processor executed threads, or processes. |
| Access level | Private or public to group. When set to private, GPF on illegal access by other threads in same group or other group. |
| Structure TypeCode | Code/Data, TLB, L1, L2, L3 cache etc. |
| Interrupt Mapping | This holds mapping/addresses for Interrupt Service Routines. |

For example, 4096 bits are used to identify a region (e.g., ways and sets) in LLC per CPU, 12 bits are used to identify a region (e.g., ways and sets) in TLB per CPU, 15 bits+15 bits are used to identify a region (e.g., ways and sets) in L1 Cache (32K code+32K data), and 20 bits are used to identify a region (e.g., ways and sets) in L2 Cache (1024 K). This data structure may also be split across different thread-indexed structures specific to each level of the cache under management (such that the structures could be stored alongside or in each corresponding level of cache to distribute the cost).

Figure 2C:
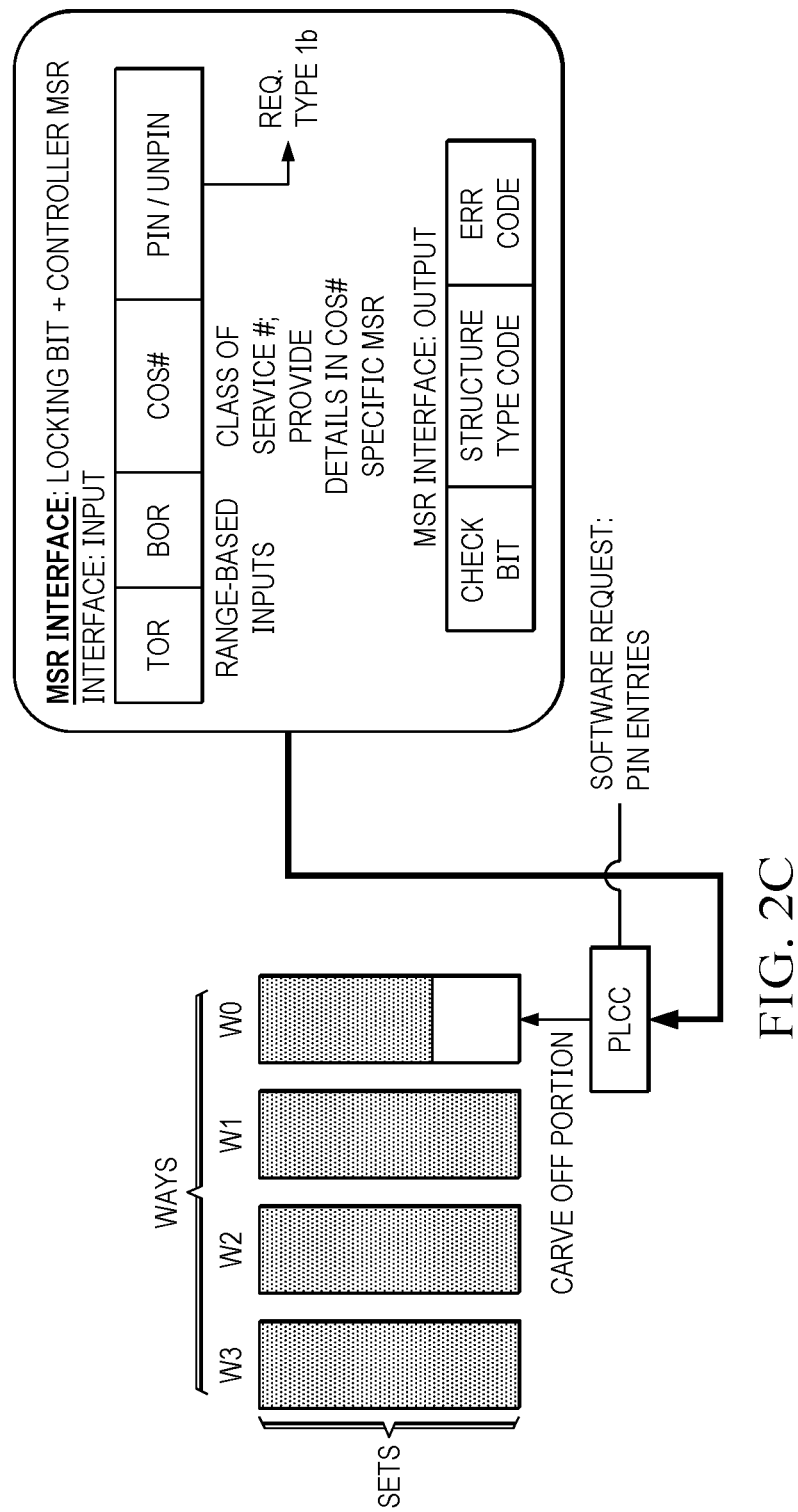
FIG. 2C depicts an example of a controller.

FIG. 2C depicts an example of an operation of a cache lock controller. In some examples, control of managing cache capacity is granted to cache lock controller and cache lock controller manages cache capability to pin (lock) cache lines. Cache lock controller can negotiate with an application to lock of a portion of a cache by providing possible way or mask combinations to lock or unlock portions of a cache. A Model Specific Register (MSR) or MMIO can be used to provide a transparent interface to program controller capabilities.

Controller can receive requests from an application for one or more of: top of address range (TOR), base of address range (BOR), class of service (COS) and information such as specific ways and sets and/or lock and unlock request (e.g., pin/unpin). Controller can respond to requests by providing one or more of: Error Code, check bit to show whether requested resource is locked or unlocked, or provide structure type code (e.g., Code/Data, TLB, L1, L2, L3 cache etc.).

Next, examples of formats for requests to a controller and responses from a controller are described. An Interface Input is a programmable interface to specify at least (a) range based inputs (e.g., TOR and BOR); (b) resource selection (e.g., code or data, TLB, L1 cache, L2, cache, LLC); (c) Lock (Pin) or Unlock (Unpin) option; and/or (d) Class of Service id to represent further locking/unlocking criteria for the resource. An Interface Output verifies if an input Interface Input operation completed successfully or returned some failure condition. The Interface Output can specify one or more of: (a) error code representing which resource locking/unlocking requested successfully completed or failed and/or (b) status of operation returned representing Success, Failure or resource already in use (e.g., is pinned).

An OS, virtual machine manager (VMM), or application may either allow the controller to manage underlying details of the caches such as sets or ways or may take charge and manage that mapping depending on the implementation.

In some examples, an application or other thread or device can provide Input MSR #_TOR_BOR_Programming to a register or memory region to interact with a cache controller to reserve or attempt to pin content in a cache or TLB. After a region is locked, an application can cause content, data, code, address translations, to name a few, to be loaded into a locked region of cache or TLB. In some embodiments, an application can cause content, data, code, address translations, to name a few, to be loaded into an unlocked region of cache or TLB and then request lock after loading. Input MSR #_TOR_BOR_Programming can be used to request a pin or unpin operation by a cache lock controller. Table 1 provides an example of fields for MSR #_TOR_BOR_Programming that provide capabilities to specify an address range (e.g., physical address range or virtual address range) that is requested to be locked in a cache or TLB. Details about resource type and granularity options can be mentioned in Class of Service # (COS #) (see Table 2). A number of COS is implementation specific.

TABLE 1

| Name/Field | Range | #Bits | Attribute | HW Reset Value | Example Description |
|---|---|---|---|---|---|
| Pin/Unpin | 0-1 | 1 | RW | 0 | Request to lock or unlock region of cache or TLB. |
| Top of range (TOR) | 32/64 | 32/64 | RW | 0 | Top of range specification. |
| Bottom of range (BOR) | 32/64 | 32/64 | RW | 0 | Bottom of range specification. |
| Class of service (COS#) | 0-15 | 4 | RW | 0 | Class of service number specification. |

For a cache that is allocated according to sets and ways, Input MSR #_COS #_SET_WAY_CACHE can be used in a request for set and ways granularity along with structure type or resource type. The cache lock controller can internally handle allocated sets and ways or caching regions to avoid fragmentation and further simplify programming capabilities. In this example, an application only needs to provide a number of sets and ways. Table 2 provides an example description of fields of the contents of MSR #_COS #_SET_WAY_CACHE.

TABLE 2

| Name/Field | Range | #Bits | Attribute | HW Reset Value | Example Description |
|---|---|---|---|---|---|
| Pin/Unpin | 0-1 | 0 | RW (read or write) | 0 | Request to lock or unlock. |
| Number of Sets # | 0-512 | 5 | RW | 0 | Number of the sets to be locked. |
| Number of Ways # | 0-8 | 4 | RW | 0 | Number of ways to be locked. |
| COS | 0-31 | 6 | RW | 0 | N number of possible ways |
| Expand (Policy) | 0-4 | 2 | RW | 0 | See table for policy. |
| Thread Groups Association | Total Cores in a group of 4 | 4 | Write Once | 1 | Associate this COS with a core or set of cores. |

TABLE 2-continued

| Name/Field | Range | #Bits | Attribute | HW Reset Value | Example Description |
|---|---|---|---|---|---|
| Access Level | 0-1 | 1 | Write Once | 0 | Private or public to group. When set to private, general protection fault (GPF) on illegal access by other threads in same group or other group |
| Structure Type Code | 0-7 | 3 | W (write) | 0 | Data/Code, TLB, L1, L2, L3. Encoded request type. |

The following provide examples of responses provided by a controller. Output MSR #_SET_WAY_CACHE is a format for a cache lock controller to specify capabilities to read back status of current requested input set of MSRs in response to a request from an application to identify locked or unlocked regions in a cache or TLB. If the output returns Success or Grant, then the application or its programmer secured the requested allocation for the specified. In case of any errors or denial of grant, an error code can be returned using this output. Further, these error codes can be used by an application to modify a region requested for locking and the application can submit another, modified request. Table 3 provides a description of fields of MSR #_SET_WAY_CACHE and an example description of fields. MSR #_SET_WAY_CACHE can be used to perform a status check. For example, the response of Table 3 can be used to reply to a request of format Table 1 or Table 2.

TABLE 3

| Name/Field | Range | #Bits | HW Reset Value | Example Description |
|---|---|---|---|---|
| Check Bit | 0-1 | 1 | 0 | Locked or Unlocked |
| Structure Type Code | 0-7 | 3 | 0 | Data/Code, TLB, L1, L2, L3. Encoded request type |
| Err Code | 0-3 | 2 | 0 | See Table 4 for a description of error codes. |

A denied request to lock a region of the cache or TLB can also provide an identification of reasons for a denial. Table 4 provides set of guidelines that can be used by an application or its developer to re-request appropriate set of ways and sets. When an application or its developer resubmits a request because of previous failed inputs, the application or programmer can use guidelines to pick possible combinations or policy that can does not violate reasons for a denial of a prior request. Application could reduce or modify request (way/set) to fit within an available lockable region. In some embodiments, the controller, upon initial failure to lock a region, may rearrange data regions internally to try to make room before attempting again and either succeed or fail. Note that the scratch pad tracks occupied and unoccupied areas in cache (including decoded instruction stream cache) or TLB.

TABLE 4

Reasons for denial of a lock request

| Is MSR#_SET_Cache Expand field (Policy) | Is MSR#_WAY_Cache Expand field (Policy) | Policy |
|---|---|---|
| 0 | 0 | Locked Region (Cannot Expand) |
| 1 | 0 | Reached Way Limit |
| 0 | 1 | Reached Set Limit |
| 1 | 1 | Expand possible |

Other reasons for failure (denial of request) may include excessive fragmentation of locked regions, or set/way conflicts, or a one or more defragmentation rounds were attempted but still failed to make space. The reasons for denial of request can be indicated using codes.

In some examples, regardless of success or error, controller can provide a response with some or all of the fields in the scratch pad to the application to indicate available resources.

When a cache is allocated according to ways and sets and an application's previous request reports an error, a response provided by Table 5 can be used. Table 5 provides an example to indicate available ways and sets. Hence, an application can read Available MSR #as a hardware hint which indicates availability in a cache or TLB such that the application can make a future request for available sets or ways.

TABLE 5

Available MSR#

| Name/Field | Range | #Bits | HW Reset Value | Example description |
|---|---|---|---|---|
| Number of available Sets # | 0-512 | 5 | RW | 0 |
| Number of available Ways # | 0-8 | 4 | RW | 0 |

The controller can be programmed to have cache sets and ways with specified data retention rate levels. For example, an application developer can specify data retention rate levels in any cache level or TLB. Table 6 provides an example of fields that can be used to set a data retention policy in MSR.

TABLE 6

Data Retention Policy

| MSR#_SET_L2SW Expand field (Policy) | MSR#_WAY_L2SW Expand field (Policy) | Policy |
|---|---|---|
| 0 | 0 | Unlocked Region |
| 1 | 0 | Protected and locked (not subject to any eviction) |
| 0 | 1 | Subject to possible eventual eviction |
| 1 | 1 | Subject to eviction only by other locked data in case of contention which software deems acceptable |

Figure 3A:
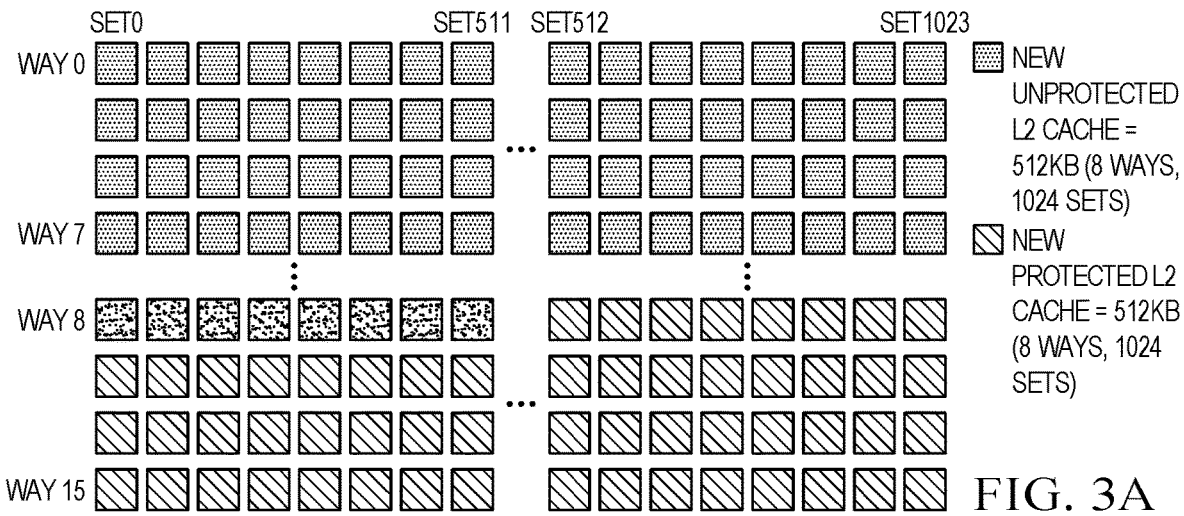
FIG. 3A shows allocation of cache lines to promote capacity eviction.
Figure 3B:
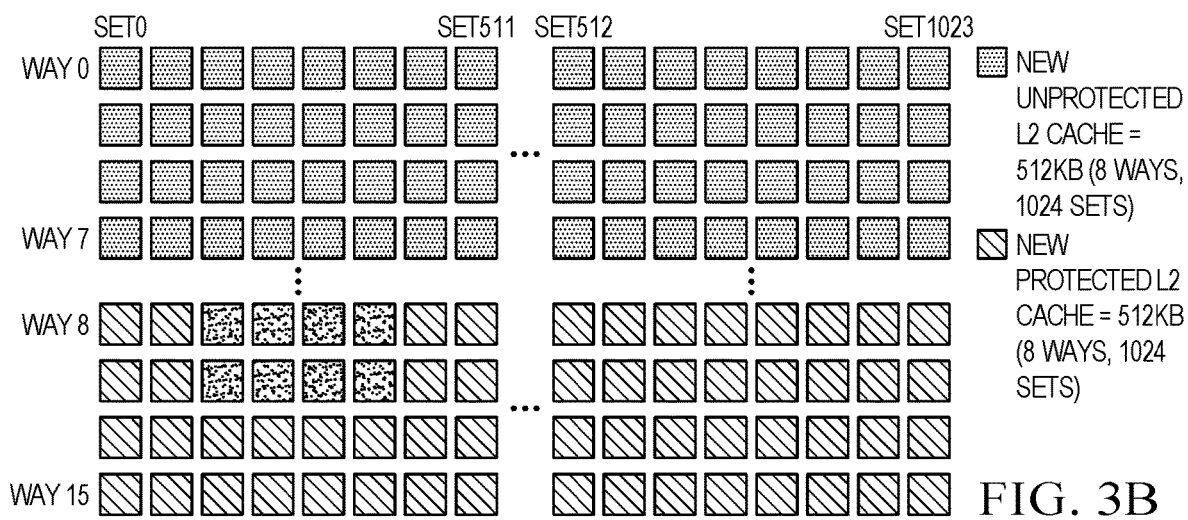
FIG. 3B shows allocating cache lines to provide an above average eviction rate.
Figure 3C:
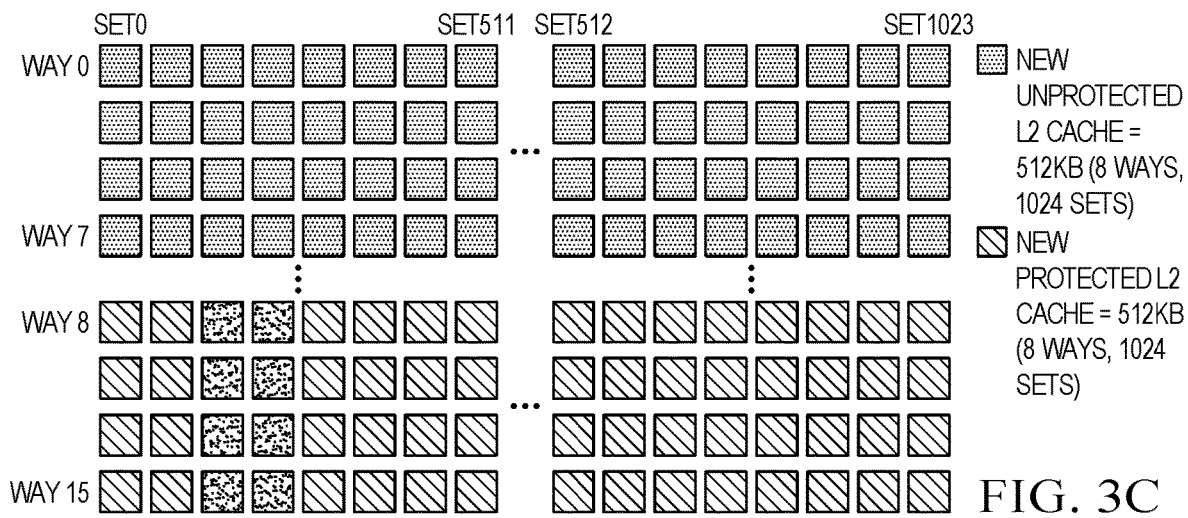
FIG. 3C shows allocating cache lines to provide a longest data retention rate.

With respect to the data retention policies of Table 6, FIGS. 3A-3C provide examples of fast, balanced, and priority (slow) eviction. A processor causes data copying into the cache with cache lines (e.g., n bytes at a time). When a set is expandable and way is fixed, it is evicted faster to be replaced by another cache line. However, when a set is fixed, and ways are expanding, the reserved block will evict slower. FIG. 3A shows allocation of 512 cache lines from single way helps to promote capacity eviction. For a slow (priority) eviction rate, in an N ways and M set, N is much smaller than M.

FIG. 3B shows allocating 512 cache lines from 4 ways and 256 sets provides a balance for data retention as well as slightly above average eviction rate. For a balanced eviction rate, in an N ways and M set, N is approximately equal to M.

FIG. 3C shows allocating 512 cache lines from 8 ways and 128 sets provides longest data retention rate. For a slow (priority) eviction rate, in an N ways and M set, N is much larger than M.

An application developer can request a slow eviction rate for its data or code that is most time critical, fast eviction for content that is least time critical, or balanced for moderately time critical content.

Figures 1, 4A:
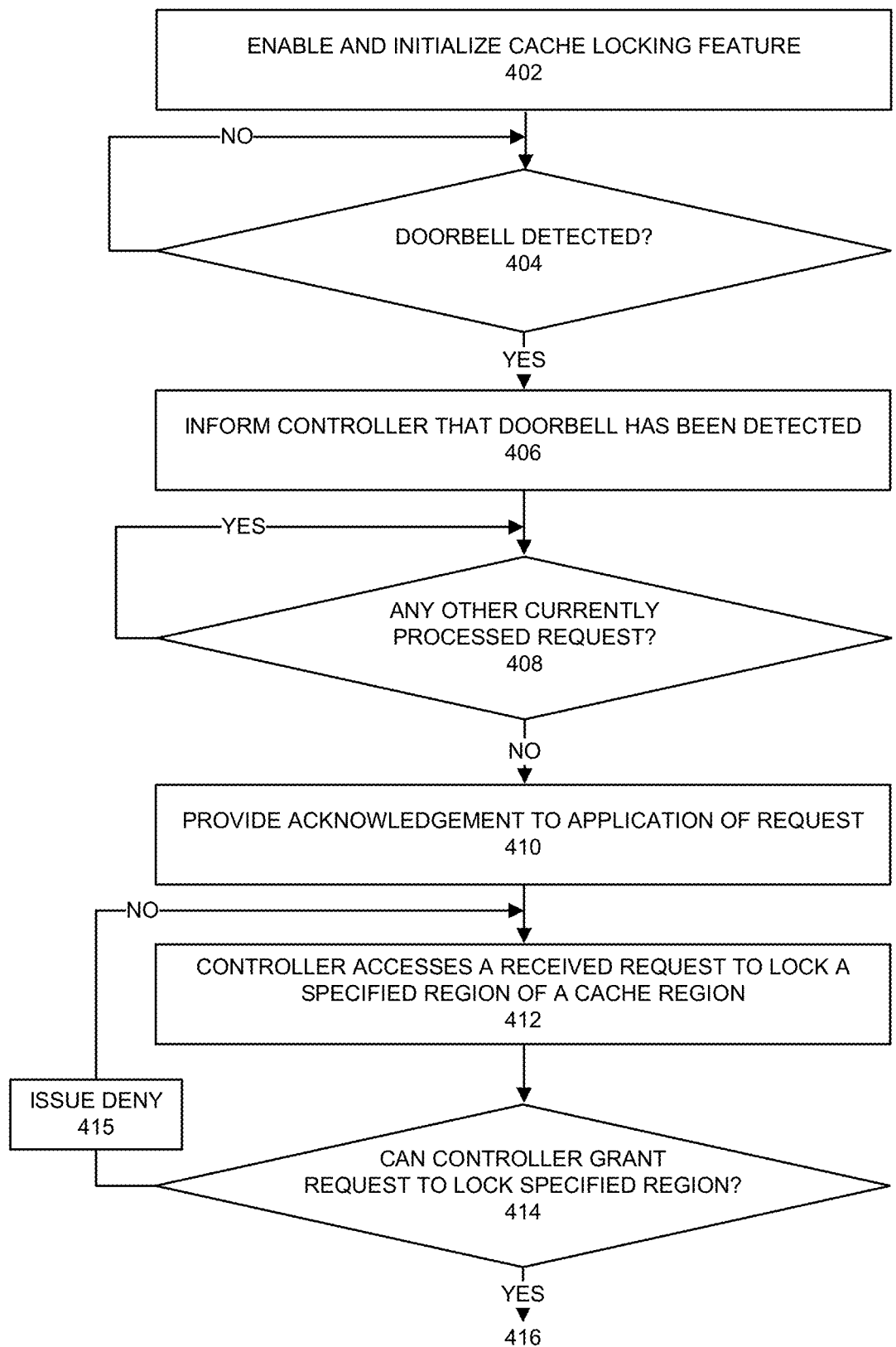
Figures 2, 4A:
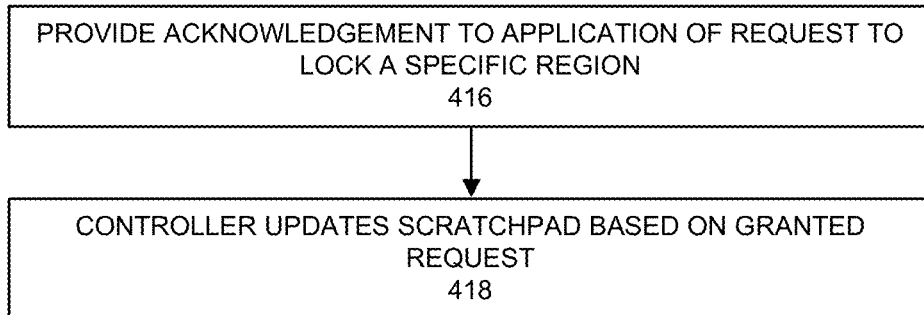

FIG. 4A-1 and 4A-2 depict an example process performed by a controller to permit or deny cache or TLB locking. Applies to each of layer of cache (L1, L2, LLC, TLB, decoded instruction stream cache). At 402, the cache locking feature and controller feature is enabled and initialized. For example, enablement and initialization can include operating system (OS) enablement or writing to model specific register (MSR) in user space to establish access level and thread group association. Also, interrupts can be disabled during the initial set up phase of locking by use of the controller. Disabling the interrupts can ensure interrupts do not pollute the same cache region that a controller wants to lock. For example, non-maskable interrupts can be disabled to prevent locking of regions of a cache or TLB prior to the controller being able to control cache or TLB locks. Another technique is to constrain interrupts and other code while running to only the non-lockable regions of the cache, which allows a locking setup operation to proceed even if interrupts remain enabled.

At 404, a determination is made as to whether a doorbell is detected to request cache locking of a particular region of a cache. For example, an application can ring a doorbell by writing to an MMIO address space, MSR, register, or any shared memory space. A core that runs the application can ring the doorbell and request locking of L1, L2, or LLC cache or TLB. If a doorbell is detected, the process continues to 406. If a doorbell is not detected, 404 repeats.

At 406, the process informs a controller that a doorbell is detected. For example, if the controller is in a reduced power usage state, detection of a doorbell can cause a wakeup of the controller.

At 408, the process makes a determination of whether there are any other inflight requests to lock any cache region from another thread or application. In some examples, multiple threads can make requests to lock a region of a cache but just one request to lock a region of a cache can be accepted and processed at any time. If no other inflight thread requests are active, then the process proceeds to 410. If another request is active and being processed by the controller, then the process waits until a sole request is pending before proceeding to 410. Requests can be served first come, first served. In other examples, requests could be prioritized in the MSR, MMIO, or other register or memory region based on an application or application type.

At 410, the controller provides an acknowledge (ACK) message or indication to the application that is permitted to lock a portion of a cache. For example, the ACK indication can be provided by writing to specific bits MMIO bits or a message in an MSR, register or memory. The bits or message can be accessible to an application. In some examples, the controller declines a request from an application and does not provide an ACK if protection fault or any of the region is not available. In some examples, along with the ACK or in place of the ACK, an indication of available cache region or TLB is provided to inform the application of availability and potentially reduce time to negotiate to a grant of a locked region.

At 412, the process provides the controller with a request to lock of a specified region of a cache region. The request can be written to the MMIO address space, MSR, or memory region. For example, the request can include information described for example in Table 1 to pin/unpin part of cache (e.g., SET and WAYS axis) or other description of an amount of cache lines or cache size or TLB (e.g., in bytes) to lock.

At 414, the process causes the controller to determine if a response to lock a specific region can be granted. The controller can access a scratch pad for regions of L1, L2, LLC, or TLB usage or locking to see what cache regions are available. A scratch pad can represent locked and unlocked regions of a L1, L2, LLC, or TLB. The scratch pad can be stored in memory or a cache and accessible to the controller. If a specified region is not locked and available for locking based on inspection of the scratch pad, the controller can indicate whether the request to lock a specific region can be granted or is denied. The controller can return an indication of success if the controller can grant the lock of the specific region requested by application.

If an indication of grant is provided, the process continues to 416. The controller can return an indication of error if the controller cannot grant the lock of the specific region requested by application. If the controller cannot grant the lock of the specific region requested by application, the process proceeds to 415.

At 415, the process can cause the controller to respond with a denial. The controller can provide with an error code an indication of what cache regions are locked or which regions are unlocked. The process continues to 412.

At 416, the process causes the controller to provide a grant response to the request for locking a specific region. The grant response can use a response formats described with respect to Table 3 above. At 418, the process causes the controller to update its scratch pad with locked data. The controller marks entries in scratch pad as locked for application. The scratch pad can be locked so it will not change while an application is negotiating for lock of cache.

After an application terminates, a driver can clean up locked cache to evict locked content of the application. For example, an operating system (OS) can notify a driver to unlock a cache region. A driver or some other process termination handler code (e.g., modified OS kernel code) could also clean locked cache to evict locked content.

In some examples, a doorbell to request a cache lock and a request to lock a specific cache region can be sent as one communication, instead of separate communications. Accordingly, a doorbell can also include a request to lock a specific cache region.

Figure 4B:
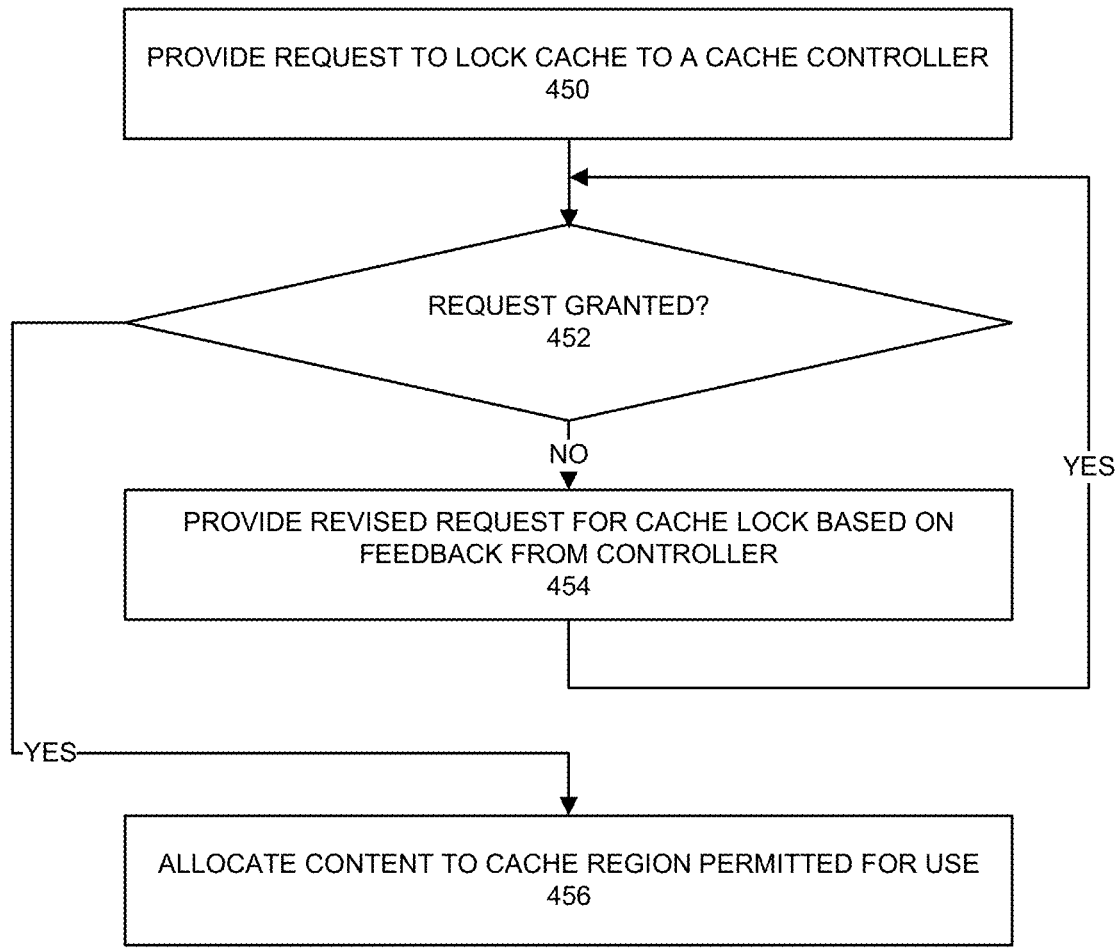
FIG. 4B depicts an example process performed by an application or entity to request locking of a cache region.

FIG. 4B depicts an example process performed by an application or entity to request locking of a cache region. The cache region can be a L1, L2, L3, LLC, or TLB. At 450, the process includes an application writes a request to lock a cache region. The request can be written to an MSR, MMIO, register, or memory region. At 452, the process includes an application detecting a response to the request and determining if the response is a grant or denial. The request can be provided by a controller that is responsible for managing cache locks. The response can be a grant or denial of the request. If the response is a grant, then 456 follows. If the response is a denial, then 454 follows.

At 454, the process can read an indication of reason for denial and provide a different request for a cache lock. The different request can include a request for a different specified region of cache or type of cache. The process continued to 452.

At 456, the process causes the application or its delegate to load content into the cache region specified in the request. The content can include workloads, executable binaries, un-compiled instructions, complied instructions, or data, or for any uses.

In some examples, a response engine or cache controller can provide cache or TLB locking on a first-come-first-served basis. In some examples, a response engine or cache controller can provide cache or TLB locking based on priority of an application that requests cache locking and can cause eviction of locked content of another application. For example, if application 0 has content locked in a cache or TLB, and application 1 is a higher priority than application 0, then a request to response engine or cache controller to lock a portion of cache or TLB by application 1 can cause eviction of content locked by application 0 and a notification to application 0 of eviction of content. Application 0 could thereafter request locking of cache or TLB to response engine or cache controller and its request may cause eviction of content cached by a lower priority application (e.g., application 2).

Figure 5:
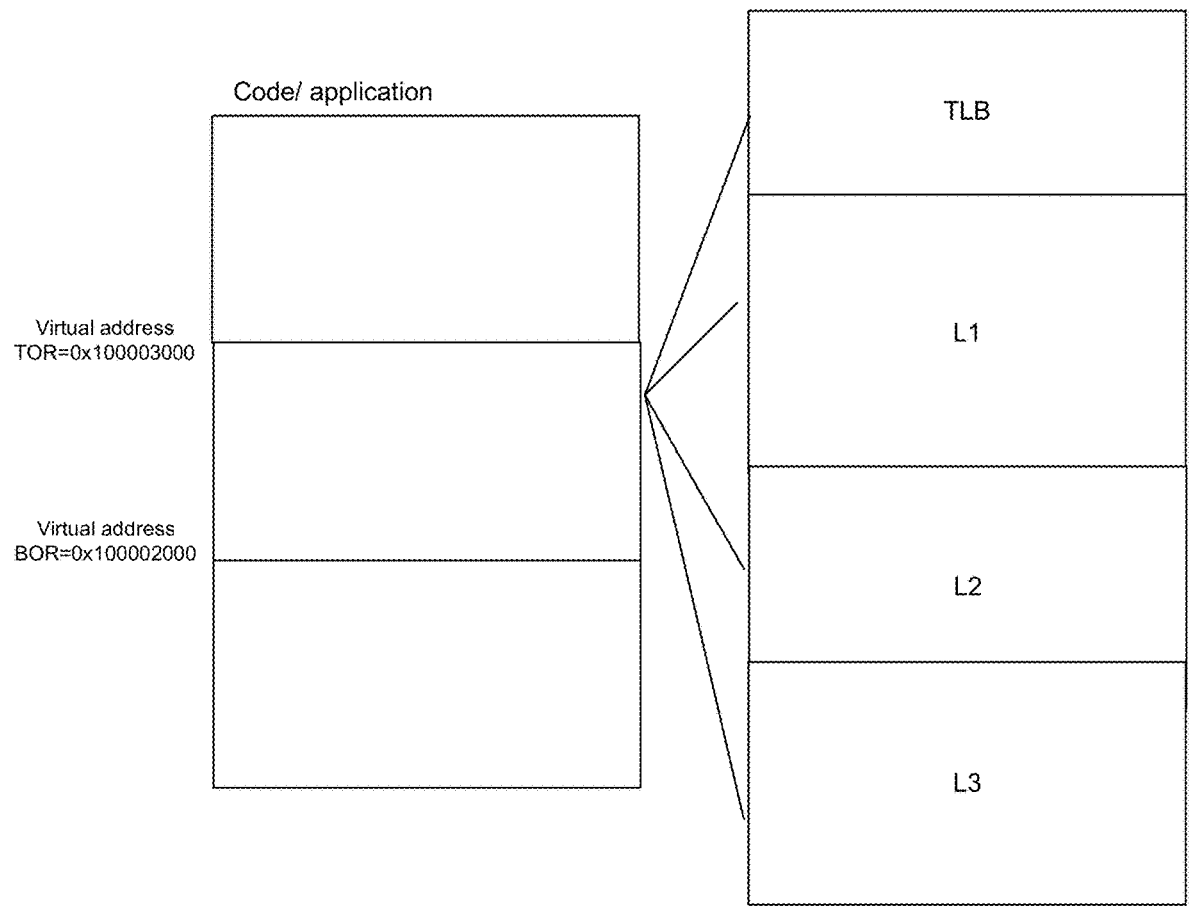
FIG. 5 depicts an example of cache locking.

FIG. 5 depicts an example of representation of a virtual address region that can correspond to cache levels and TLB that can be supported by a scratch pad. In this example, virtual address region 0x100002000 to 0x100003000 can be allocated to L1, L2, or L3 cache or TLB.

A version of the pseudocode provided below can be used in an application as a request to a cache lock controller. As a cache lock controller reads this TOR and BOR from registers, it takes it as a hint to push the data or code in the TOR and BOR mentioned to be locked in different cache hierarchies. For example, a stock trading application has highly traded set of stock tickers hash information linked to its database in a low latency highly available cache which would be cached for longer time. The following code could be used assert to a request to lock a region of cache of stock ticker related data. Embodiments are not limited to this example. Command "WRMSR" provides for writing the MSR with specified fields.

```
//Assign slow eviction rate policy, Set expand bit is 0 and Ways expand bit is 1
WRMSR (MSR_L2SW_SET_COS1 (START=0, END=15, Expand=0))
//Define class of service for ways and policy
WRMSR (MSR_L2SW_WAY_COS1 (Expand=1, Mask=0x0003))
WRMSR (MSR_L2SW_SET (ThreadGroup=1)
WRMSR (MSR_L2SW_SET (AccessLevel=1)
//Set working data sets of top 1000 tickers hashes linked to the database locked in L2
WRMSR (MSR_L2SW_FILL_OPEN=1)
WRMSR (MSR_L2SW_PQOR_ASSOC=1)
for (size=0; <1024;size++)
fowl [size]= INPUT_VALUE;
WRMSR (MSR_L2SW_FILL_CLOSE=1)
:
:
For Database queries like querying among top 1000 tickers, the hash information can be in the L2
cache.
SELECT COUNT(*)
WHERE DATA_NAME= 'XYZ';
```

Figure 6:
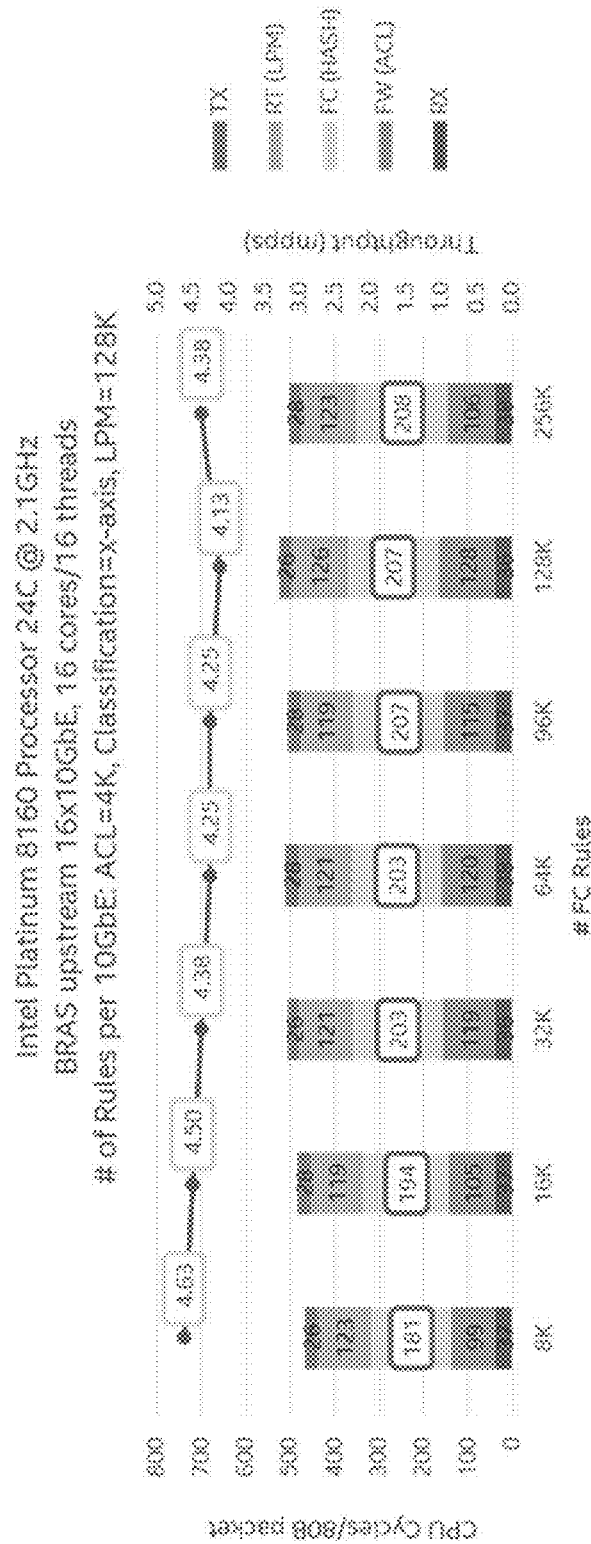
FIG. 6 depicts an example performance comparison.

FIG. 6 depicts an example performance comparison. An example on how cache pseudo-locking can benefit networking function virtualization (NFV) workload is provided next. The benchmark is simulating Broadband Remote Access Server (BRAS), aka Broadband Network Gateway (BNG) (e.g., Juniper vMX product), functionalities which is typically seen between core network and edge devices communicating through PPPOE sessions. Typical BRAS networking flows from edge to core network involve three major functional blocks, namely, Access Control List (ACL), flow classification and policer (e.g., trtcm metering algorithm) and routing. Since all of these functionalities ran on general cache coherent server, different table sizes for different networking functions impacts the cache residency. FIG. 6 shows overall performance degraded as flow classification table size enlarge. From 8,000 rules to 128,000 rules, performance degraded from 4.6 million packets per second (mpps) 4.13 mpps, or 11 percent performance degradation.

The cycle cost in the flow classification function increased as the rule size increased. However, the ACL function that used constant ACL table size also observed cycle increasing as flow classification rule sizes changed. After further analysis, the reason ACL function cycle increase was due to additional L3 cache misses. This undesired impacted on ACL function cycle increasing could be mitigated by using pseudo-cache locking mechanism to can lock these ACL data structure in the cache and achieve deterministic ACL lookup performance.

Figure 7:
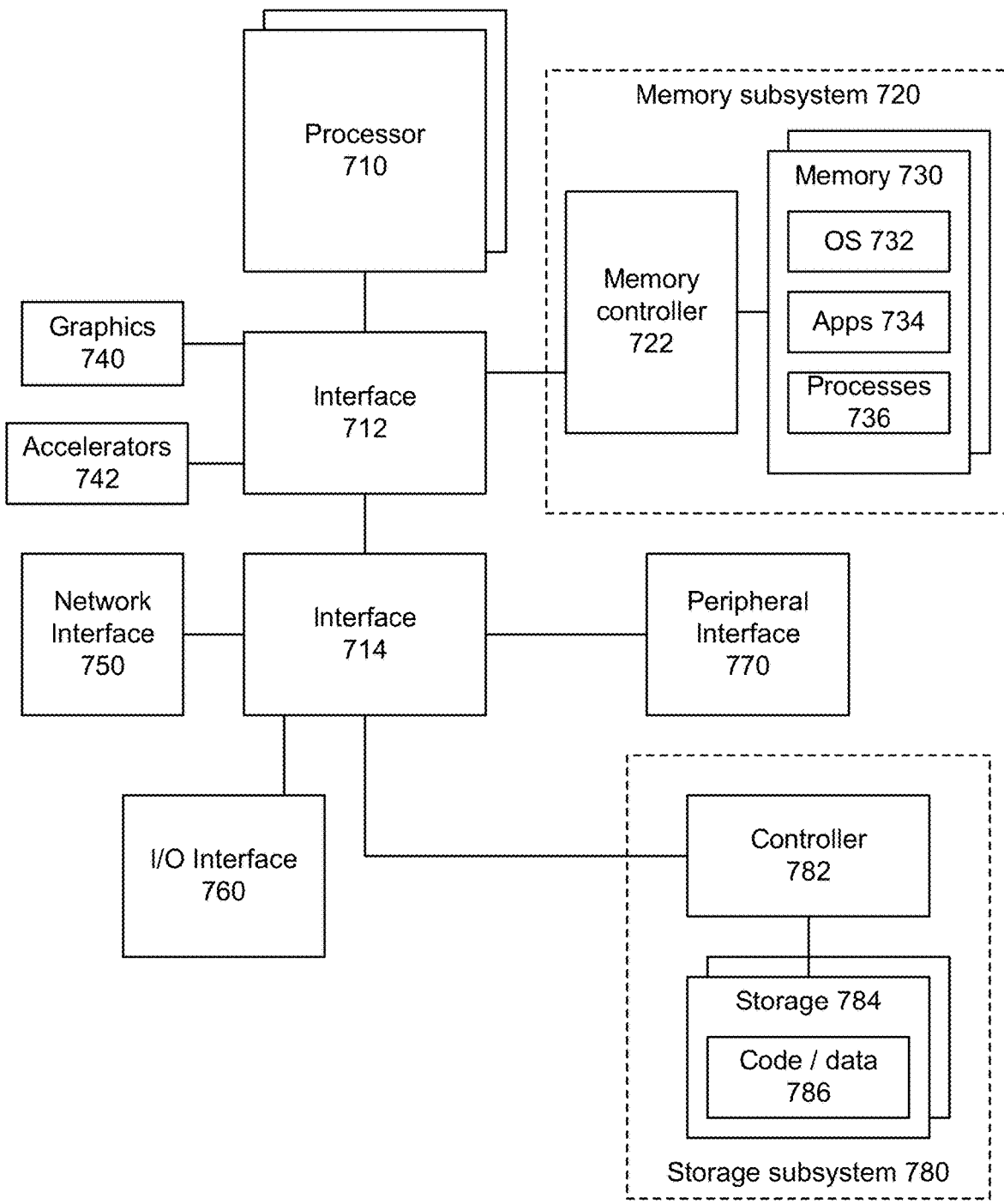
FIG. 7 depicts a system.

FIG. 7 depicts a system. The system can use embodiments described herein to identify region of a cache to lock. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, processor cores, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, volatile memory, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 8:
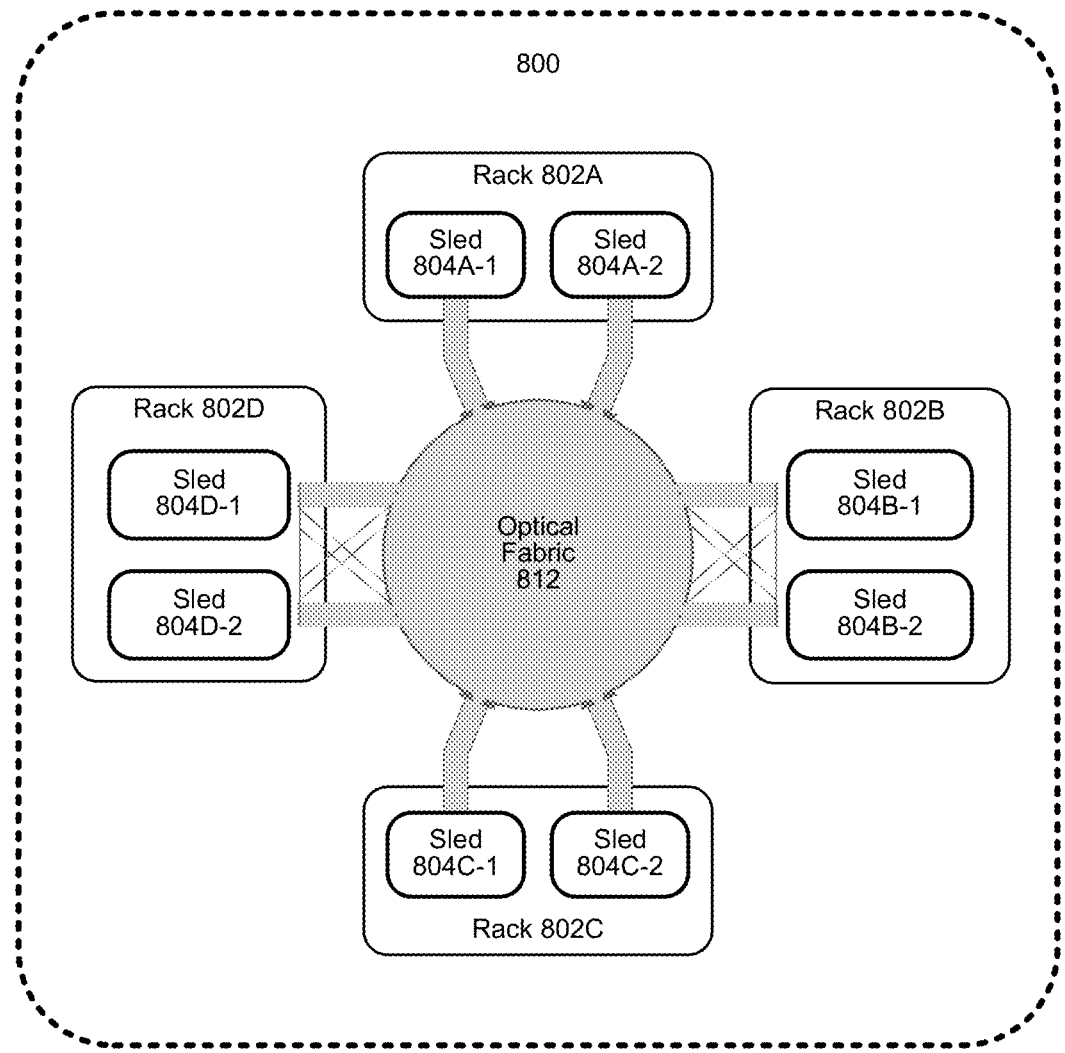
FIG. 8 depicts an example of a data center.

FIG. 8 depicts an example of a data center. Various embodiments can be used in or with the data center of FIG. 8 to provide data transfers to memory via accelerator fabrics. As shown in FIG. 8, data center 800 may include an optical fabric 812. Optical fabric 812 may generally include a combination of optical signaling media (such as optical cabling) and optical switching infrastructure via which any particular sled in data center 800 can send signals to (and receive signals from) the other sleds in data center 800. The signaling connectivity that optical fabric 812 provides to any given sled may include connectivity both to other sleds in a same rack and sleds in other racks. Data center 800 includes four racks 802A to 802D and racks 802A to 802D house respective pairs of sleds 804A-1 and 804A-2, 804B-1 and 804B-2, 804C-1 and 804C-2, and 804D-1 and 804D-2. Thus, in this example, data center 800 includes a total of eight sleds. Optical fabric 812 can provide sled signaling connectivity with one or more of the seven other sleds. For example, via optical fabric 812, sled 804A-1 in rack 802A may possess signaling connectivity with sled 804A-2 in rack 802A, as well as the six other sleds 804B-1, 804B-2, 804C-1, 804C-2, 804D-1, and 804D-2 that are distributed among the other racks 802B, 802C, and 802D of data center 800. The embodiments are not limited to this example. For example, fabric 812 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes a controller to manage use of cache regions, the controller comprising: a scratch pad to identify one or more regions of a cache that are locked and a response engine to read a request to lock a portion of a cache and indicate whether the request is granted or denied, wherein the request comprises an identified region of a cache to lock and wherein the response engine is to deny a request to lock a portion of the cache based on a portion of the identified region being identified as locked by the scratch pad.

Example 2 includes any example, wherein the response engine is to read a second request, the second request received after the request and the second request is different than the request.

Example 3 includes any example, wherein to read a request, the response engine is to read a register, wherein the register comprises a model specific register (MSR) or memory-mapped I/O (MMIO).

Example 4 includes any example, wherein a request comprises a specification of one or more of: a pin or unpin, top of range, bottom of range, or class of service.

Example 5 includes any example, wherein a request comprises a specification of one or more of: a number of sets, number of ways, or class of service.

Example 6 includes any example, wherein a response comprises one or more of: a check bit, structure type code, or error code.

Example 7 includes any example, wherein a response comprises an indication of a denied request and the indication comprises one or more of: an indication a region is locked, a way limit is reached, a set limit is reached, an expansion is possible, indication that a capacity limit has been reached, or an indication that the controller tried to defragment the region but still failed.

Example 8 includes any example and includes a memory to store the scratch pad.

Example 9 includes any example, wherein the cache comprises one or more of: a translation lookaside buffer (TLB), level-1, level-2, level-3, last level cache (LLC), or decoded instruction stream cache.

Example 10 includes any example and includes the cache and a translation lookaside
buffer (TLB).

Example 11 includes any example and includes a server, data center, rack, or network interface.

Example 12 includes any example, wherein a request comprises a data retention policy to specify an eviction rate for content in a cache or translation lookaside buffer (TLB).

Example 13 includes a computer-implemented method comprising: identifying locked regions of a cache or translation lookaside buffer (TLB) in a table; receiving a request to lock a region of the cache or the TLB, the request specifying a starting and ending identifier of the region; and providing a response to the request, the response comprising: a grant of the request or denial of the request based on any portion of the region is locked based on the table and indicating at least one basis for declining the request.

Example 14 includes any example, and includes: receiving a second request, the second request received after the request and the second request different than the request.

Example 15 includes any example and includes: reading a request from a register and writing a response to the register, wherein the register comprises a model specific register (MSR) or memory-mapped I/O (MMIO).

Example 16 includes any example, wherein the request comprises a specification of one or more of: a pin or unpin, top of range, bottom of range, or class of service.

Example 17 includes any example, wherein the request comprises a specification of one or more of: a number of sets, number of ways, or class of service.

Example 18 includes any example, wherein the request comprises one or more of: an indication the region is locked, a way limit is reached, a set limit is reached, an expansion is possible.

Example 19 includes any example, wherein a request comprises a data retention policy and comprising applying the data retention policy to the cache or translation lookaside buffer (TLB).

Example 20 includes a system comprising: a central processing unit comprising at least one core and at least one cache and a cache lock controller coupled to the central processing unit, the cache lock controller comprising: a scratch pad to identify one or more regions of a cache that are locked and a response engine to read a request to lock a portion of a cache and indicate whether the request is granted or denied, wherein the request comprises an identified region of a cache to lock and wherein the response engine is to deny a request to lock a portion of the cache based on a portion of the identified region being identified as locked by the scratch pad.

Example 21 includes any example, wherein the response engine is to read a second request, the second request received after the request and the second request different than the request.

Example 22 includes any example, wherein to read a request, the response engine is to read a register, wherein the register comprises a model specific register (MSR) or memory-mapped I/O (MMIO).

Example 23 includes any example, wherein a request comprises a specification of one or more of: a pin or unpin, top of range, bottom of range, class of service, or identification of an application issuing a lock/unlock request.

Example 24 includes any example, wherein a response comprises an indication of a denied request and the indication comprises one or more of: an indication a region is locked, a way limit is reached, a set limit is reached, an expansion is possible, indication that a capacity limit has been reached, or an indication that the controller tried to defragment the region but still failed.

What is claimed is:

1. An apparatus comprising:
 a plurality of cores;
 a shared cache to be shared by the plurality of cores;
 cache range reservation hardware logic including one or more registers to store a plurality of fields including a first field to store a base address of a physical address range, a second field to store information to be used in combination with the base address to determine if an address is within the physical address range, and a third field to store an indication of one or more ways, the first, second, and third fields to be written responsive to one or more instructions executed on a core of the plurality of cores,
 wherein based on the first, second, and third fields, a portion of the shared cache is to be locked for use by cache lines associated with the physical address range, the portion based on the indication of the one or more ways,
 wherein cache lines stored in the portion of the shared cache are to only be replaced by other cache lines associated with the physical address range.

2. The apparatus of claim 1 wherein the cache range reservation hardware logic includes or is coupled to a cache controller to lock the portion of the shared cache for use by cache lines associated with the physical address range.

3. The apparatus of claim 2 wherein the cache controller is to identify the portion of the shared cache to be locked in accordance with the indication of the one or more ways.

4. The apparatus of claim 1 wherein the one or more instructions comprise one or more write MSR (WRMSR) instructions to write to one or more of the first, second, and third fields.

5. The apparatus of claim 1 wherein a core of the plurality of cores is to execute a write back and invalidate (WBINVD) instruction to invalidate cache lines stored in the portion of the shared cache.

6. The apparatus of claim 2 wherein the cache controller is to implement an eviction or flushing policy for the portion of the shared cache.

7. The apparatus of claim 6 wherein the eviction or flushing policy ensures that the cache lines stored in the portion of the shared cache are to only be replaced by other cache lines associated with the physical address range.

8. The apparatus of claim 1 wherein the shared cache comprises one or more of: a Level-1 (L1) cache, a Level-2 (L2) cache, a Level-3 (L3) cache, a last level cache (LLC), or a translation lookaside buffer (TLB).

9. The apparatus of claim 1 wherein the one or more registers include a model specific register (MSR), a memory mapped IO (MMIO) register, or a memory type range register (MTRR).

10. The apparatus of claim 1 wherein the information is a maximum address.

11. The apparatus of claim 1 wherein the information is an ending identifier for the physical address range.

12. A non-transitory machine-readable medium having program code stored thereon which, when executed by one or more processors, causes the one or more processors to perform operations comprising:
  sharing data between a plurality of cores in a shared cache;
  storing in one or more registers associated with cache range reservation hardware logic a plurality of fields including a first field to store a base address of a physical address range, a second field to store information to be used in combination with the base address to determine if an address is within the physical address range, and a third field to store an indication of one or more ways, the first, second, and third fields to be written responsive to one or more instructions executed on a core of the plurality of cores,
  locking a portion of the shared cache based on the first, second, and third fields, the portion of the shared cache to be used by cache lines associated with the physical address range, the portion based on the indication of the one or more ways,
  replacing cache lines stored in the portion of the shared cache only with other cache lines associated with the physical address range.

13. The non-transitory machine-readable medium of claim 12 wherein the cache range reservation hardware logic includes or is coupled to a cache controller to lock the portion of the shared cache for use by cache lines associated with the physical address range.

14. The non-transitory machine-readable medium of claim 13 wherein the portion of the shared cache to be locked is identified in accordance with the indication of the one or more ways.

15. The non-transitory machine-readable medium of claim 12 wherein the one or more instructions comprise one or more write MSR (WRMSR) instructions to write to one or more of the first, second, and third fields.

16. The non-transitory machine-readable medium of claim 12 wherein a core of the plurality of cores is to execute a write back and invalidate (WBINVD) instruction to invalidate cache lines stored in the portion of the shared cache.

17. The non-transitory machine-readable medium of claim 13 wherein the cache controller is to implement an eviction or flushing policy for the portion of the shared cache.

18. The non-transitory machine-readable medium of claim 17 wherein the eviction or flushing policy ensures that the cache lines stored in the portion of the shared cache are to only be replaced by other cache lines associated with the physical address range.

19. The non-transitory machine-readable medium of claim 12 wherein the shared cache comprises one or more of: a Level-1 (L1) cache, a Level-2 (L2) cache, a Level-3 (L3) cache, a last level cache (LLC), or a translation lookaside buffer (TLB).

20. The non-transitory machine-readable medium of claim 12 wherein the one or more registers include a model specific register (MSR), a memory mapped IO (MMIO) register, or a memory type range register (MTRR).

21. The non-transitory machine-readable medium of claim 12 wherein the information is a maximum address.

22. The non-transitory machine-readable medium of claim 12 wherein the information is an ending identifier for the physical address range.

* * * * *